April 15, 1941.  H. F. PATTERSON  2,238,748
POWER TRANSMISSION
Filed Jan. 22, 1940
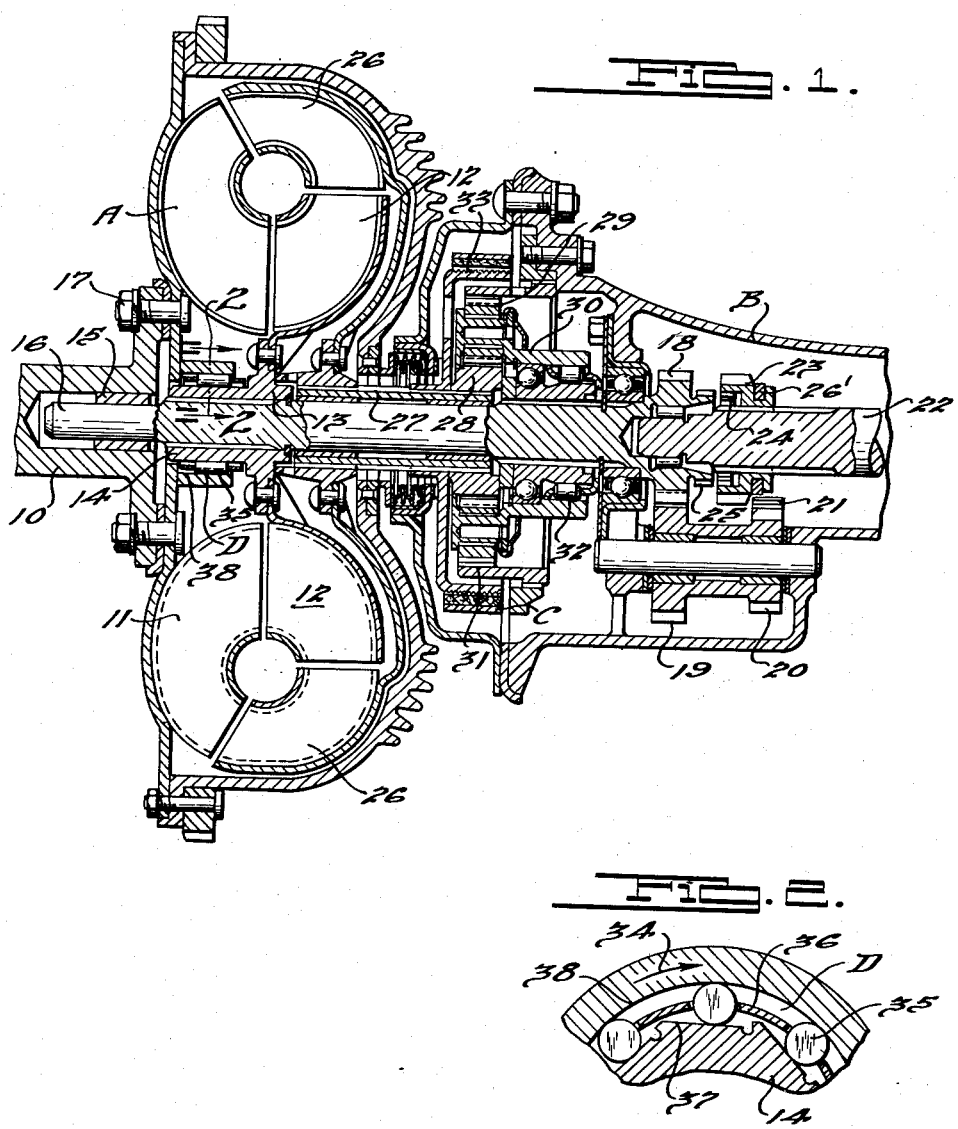
INVENTOR
Herbert F. Patterson.
BY
Harness, Dind, Pate & Harris
ATTORNEYS.

Patented Apr. 15, 1941

2,238,748

UNITED STATES PATENT OFFICE 2,238,748

POWER TRANSMISSION

Herbert F. Patterson, St. Clair Shores, Mich., assignor to Chrysler Corporation, Highland Park, Mich., a corporation of Delaware Application January 22, 1940, Serial No. 314,897

3 Claims. (Cl. 74—189.5)

This invention relates to power transmissions for transmitting power from the engine to the driving ground wheels of motor vehicles.

The invention is more particularly directed to vehicle driving systems incorporating a fluid coupling or equivalent form of slip drive through which power is transmitted from the engine.

In many driving systems incorporating fluid couplings, certain objectionable characteristics are experienced by reason of the absence of positive couple between the engine and vehicle driving wheels, whereas with more conventional driving systems employing the usual main friction-type clutch there is provided, when such clutch is engaged, a two-way non-slip connection from the engine to the transmission so that by leaving the transmission in a driving speed ratio, the engine is directly coupled with the vehicle driving wheels and may therefore be used in parking to prevent undesired vehicle roll. With many fluid coupling systems, on the other hand, the engine has a fluid slip connection through the transmission to the vehicle driving ground wheels preventing use of the engine as a vehicle parking medium.

It is an object of my invention to overcome the aforesaid disadvantages in fluid coupling drive systems by providing a simple device whereby the engine is coupled to the vehicle drive wheels such that the fluid coupling may be circumvented and the engine used to hold the vehicle on up-grades as well as on down-grades.

Another object of my invention is to overcome the aforesaid difficulties by the provision of means automatically operating to effect positive drive connection between driving and driven members of a fluid coupling under desired conditions, while at other times allowing the normal slip driving functions of the fluid coupling to take place.

Further objects of my invention are to provide means for allowing normal drive functions of a fluid coupling to take place while preventing the engine from falling below the speed of the coupling driven member. Fluid couplings have an inherent tendency to produce engine stalling at lower engine speed ranges and my invention overcomes this tendency by forcing the engine, irrespective of the fluid medium in the coupling, to take the drive from the coupling driven member when the normal direction of torque flow is reversed.

Further advantages arising from my invention reside in an arrangement of the character described which operates to facilitate starting a dead engine by towing the car, my device operating under such conditions to positively drive the engine without depending on circulation of the fluid medium to effect a drive to the engine.

Another advantage of my invention resides in the provision of improved braking conditions in fluid coupling systems as, when the vehicle tends to coast, the engine is drivingly coupled with the vehicle ground wheels more quickly than where such drive is dependent on the fluid medium. My couple in such instances is of a positive nature, free from fluid slip which is undesirable under such conditions.

Further objects and advantages of my invention will be apparent from the following detailed description of one embodiment thereof, reference being had to the accompanying drawing in which:

Fig. 1 is a sectional elevational view through a typical power transmission incorporating my invention.

Fig. 2 is a detail sectional elevational view taken along line 2—2 of Fig. 1.

Referring to the drawing, I have illustrated my invention in conjunction with a fluid coupling A interposed between the engine and a transmission B which comprises forward and reverse drive of the vehicle.

The engine crankshaft 10 drives the fluid coupling impeller structure 11 which, in turn, causes circulation of the fluid medium to a runner structure 12. Runner 12 is mounted on a hollow hub or shaft 13 which has a forwardly extending driving portion 14. A bearing 15 centers the forward end of a primary driven shaft 16 to which hub 13 is splined for drive connection thereto. Fasteners 17 serve to connect the impeller structure 11 with the crankshaft 10.

The transmission B comprises a main drive pinion 18 fixed to the shaft 16 and meshing with gear 19 of the countershaft cluster which further comprises a reverse gear 20 meshing with a reverse idler 21. The transmission output shaft comprising a secondary driven shaft or tailshaft 22 is, as usual, geared through the rear axle (not shown) to turn with the vehicle rear ground wheels and has rotatably fixed thereto a slidable clutch-gear 23 formed with clutch teeth 24 for clutching engagement with clutch teeth 25 of pinion 18. Gear 23 is shifted by yoke 26' forwardly to mesh with teeth 25 of gear 18 or rearwardly to mesh with a reverse idler gear 21.

The particular illustrated fluid coupling and gearing arrangement is that shown and described in my copending application Serial No. 171,162, filed October 26, 1937, although, if desired, any form of device may be used wherein the transmission mechanism is operably connected to the engine by a fluid coupling having at least an impeller and a runner driven thereby by fluid circulation.

In my copending application, as now shown in conjunction with my prevent invention, a primary runner is introduced between impeller 11 and runner 12 together with torque multiplying gearing between the primary runner and shaft 16 such that in the lower driving speed ranges of the car, the engine torque will be multiplied between shafts 10 to 16. However, at higher ranges including the normal cruising speed of the car, the torque multiplying gearing referred to becomes ineffective and the two runner segments turn as one runner in driving shaft 16 by fluid slip in coupling A from shaft 10.

Where a system of the aforesaid character is used, this may include primary runner 26 fixed to hollow sleeve 27 for driving sun gear 28 which is meshed with planet pinions 29 on a carrier structure 30. An annulus gear 31 is fixed to the transmission case and between carrier 30 and shaft 16 there is an overrunning clutch 32 to drive this shaft from the carrier.

It is characteristic of this type of arrangement that as the car is started from rest, the fluid from impeller A is circulated kinetically to runner segments 26 and 12 such that segment 26 operates through the planetary gearing and clutch 32 to multiply the torque to shaft 16. The shaft 16 receives drive from impeller A by way of runner 26 and, as the speed of the car increases, the torque multiplication of the planetary gearing falls off and runner 12 delivers more and more of the total drive to shaft 16 until finally, say at 25 or 30 miles per hour of car speed, runner 26 and 12 are approximately turning at the same speed and these runners operate as a single more conventional runner in receiving the fluid drive from impeller A.

With the illustrated arrangement it is often desired to employ some type of device for releasing the coupling drag effect on shaft 16 so that transmission B may be manipulated without clash. One form of device is to employ a clutch release or a brake C which, when operated, brakes the coupling runner and thereby unloads the shaft 16. The brake comprises a drum 33 fixed to shaft 27 and therefore to runner segment 26 so that when the brake is applied the circulation of fluid in coupling A is prevented. This brake may be of the so-called rocking type as more particularly described in my copending application aforesaid.

The transmission B is illustrated in neutral and forward drive is obtained by shifting gear 23 forwardly, reverse by shifting gear 23 rearwardly. Other forward speed ratios may of course be provided if desired. In the forward speed ratio the direction of engine crankshaft rotation (clockwise as at 34 in Fig. 2) may be referred to as "forward rotation" corresponding in direction with the rotation of runner 12 and shafts 16 and 27. When the transmission is in reverse, as for driving the vehicle backwards, the forward rotation of the engine crankshaft 10 and shaft 16 will now drive shaft 22 backward through the reverse gearing 18, 19, 20, 21 and 23.

As thus far described, it will be apparent that, with transmission B set for forward drive, the crankshaft 10 drives the impeller 11 such that fluid circulated thereby will drive runner 12 with slip which rapidly decreases as the engine speeds up above idling. The drive passes from runner 12 through transmission B and thence to shaft 22 to drive the vehicle; also, in cases where a primary runner segment is employed, the drive also passes from runner 26 through the planetary gearing 28, 29 to carrier 30 and thence through overrunning clutch 32 and shafts 16 and 22. On coasting, the torque reverses in direction from the shaft 22 forwardly through transmission B to runner 12 and thence through fluid coupling A to crankshaft 10. The fluid coupling operates for torque transmission for either direction of torque flow therethrough as is customary for fluid couplings.

It will be apparent that, with the mechanism as thus far described, the engine cannot be used to brake the vehicle for parking by reason of the fluid slip in the coupling A; also, at low speeds the engine could stall even though shaft 16 was geared to the vehicle drive wheels.

In order to overcome the foregoing disadvantages, and with further objects in view, I provide an automatically releasable drive connection at some convenient point preferably between crankshaft 10 and impeller 11 on the one hand, and runner 12 on the other hand. This automatic means may be in the form of an overrunning clutch D which, in and of itself, is of well known form comprising clutching rollers 35 spaced by a cage 36. One part coacting with the rollers, such as hub portion 14, is provided with a cam 37 at each roller. The other part is cylindrical at 38 and is carried by the impeller 11 and crankshaft 10. The cams are so arranged as to pinch or grip the rollers 35 whenever the forward rotation of crankshaft 10 tends to fall below that of hub 13 whereupon these parts are locked together. However, the rollers 35 immediately release to allow the crankshaft 10 to freely rotate forwardly faster than hub 13.

By reason of the foregoing arrangement, the engine may be used as a parking brake when the vehicle is left standing on an up-grade as well as on a down-grade. When on a down-grade the transmission B is left in forward drive ratio whereupon it will be apparent that tendency of the car to roll forwardly will cause forward rotation of shafts 22 and 16 and also forward rotation of hub 13. As the engine is "dead," the tendency of hub 13 to rotate forwardly will pinch rollers 35 and hold hub 13 locked to the stationary crankshaft thereby also preventing the car from rolling down-grade.

In the case of parking on an up-grade, the transmission B is left in the reverse drive setting whereupon tendency of the car to roll backwardly will likewise cause the overrunning device D to lock and thereby hold the car against movement. This is so because when the car starts to roll backwardly, the engine being dead, shaft 22 turns backward but shaft 16 and hub 13 turn forward by reason of the reverse gearing 23, 21, 20, 19 and 18.

During drive of the vehicle by the engine, the overrunning device D does not interfere with the normal desired functions of the fluid coupling A because the engine crankshaft 10 and impeller 11 are then always permitted to freely rotate faster than runner 12 and hub 13. During car coasting, the device D has the advantage of immediately coming into action to establish a positive driving couple from shaft 22 to crankshaft 10 thereby positively braking against the engine without having to wait for the fluid to establish the drive from the runner to the impeller and without having to depend on the fluid drive which, at the lower driving speeds, entails so much slip as to provide very inefficient braking by the engine.

The device D has the further advantage of greatly facilitating starting a dead engine by towing the car. With transmission B set for forward speed, the car may be towed forwardly and immediately the device D locks to cause the engine to turn over without having to reach a car speed sufficient to circulate fluid in the coupling B sufficiently to establish a drive from runner 12 to impeller 11.

It will be understood that our reference to "forward" and "backward" directions of rotation are used for convenience of reference to relative directions of rotations and not by way of limitation of any particular rotational direction.

If desired, the transmission could also have, within its casing or as an auxiliary behind it, an overdrive gear ratio greater than 1 to 1 in which event the final tailshaft would operate at a speed faster than that of the engine, when in overdrive. In any event the device D will nevertheless still automatically operate, when driving the vehicle, to prevent the engine from dropping below a predetermined speed proportionate to the rotational speed of the tailshaft depending on the particular gearing ratio, as when the vehicle goes down a steep grade or when the driver releases the customary accelerator pedal. In each instance the car will then transmit positive drive to the engine by a reversal in the direction of torque flow between the engine and tailshaft, this drive being independent of the fluid medium circulated by operation of the fluid coupling. The drive from the engine to the tailshaft 22, acting through fluid coupling A and transmission B, may be said to "bridge" or drive around the overrunning clutch D which serves to establish drive connection from the tailshaft to the engine crankshaft through the transmission B but independently of the fluid couplings.

Because of the slip in fluid coupling A, crankshaft 10 will always drive faster than shaft 16 in transmitting drive to the tailshaft 22. This slip is very small at high engine speeds but serves to produce overrun at device D whenever the engine drives the vehicle. Therefore, the device D does not interfere with the normal slip characteristics of the fluid coupling but is always ready to establish drive to the engine independently of the fluid coupling.

I claim:

1. In a motor vehicle power transmission, a power driving shaft, a fluid coupling including a rotatable impeller driven by said driving shaft for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, a driven shaft adapted for direct driving connection with said secondary runner for driving the vehicle, overunning clutch means including clutch elements one of which is adapted for driving connection to the driven driven shaft, means including a torque multiplying gear train for drivingly connecting said primary runner to the other of said overrunning clutch elements, and overrunning clutch means acting between the driving and driven shafts to automatically establish drive connection from the driving shaft to the driven shaft independently of said fluid circulation in response to tendency of the engine to drop below a predetermined speed proportionate to the rotational speed of said driven shaft, the last said overrunning clutch means operating to automatically release the last said drive connection in response to accelerating the driving shaft above said predetermined speed thereby accommodating drive of the driven shaft by the driving shaft through said fluid coupling.

2. In a motor vehicle power transmission, a power driving shaft, a fluid coupling including a rotatable impeller driven by said driving shaft for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, a driven shaft adapted for direct driving connection with said secondary runner for driving the vehicle, and gear train driving means adapted to drivingly connect said primary runner with said driven shaft for transmitting a torque multiplying drive from said primary runner to said driven shaft, said torque multiplying driving means including an overrunning clutch interposed in the drive from said primary runner to said driven shaft and so constructed and arranged as to provide overrun of said primary runner by said secondary runner, and an overrunning clutch acting between said shafts to prevent the driving shaft speed to fall below that of the driven shaft while accommodating drive of the driving shaft at a speed faster than that of the driven shaft.

3. In a motor vehicle power transmission, a power driving shaft, a fluid coupling including a rotatable impeller driven by said driving shaft for circulating a fluid in said coupling, said coupling further including relatively rotatable primary and secondary runners adapted to be driven by the circulated fluid, said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary shaft, means for directly drivingly connecting said secondary runner with said primary shaft, means operable for selectively drivingly connecting said primary shaft with said secondary shaft for a forward drive therebetween or for driving said secondary shaft in a direction opposite to that of said primary shaft, gear train driving means adapted to drivingly connect said primary runner with said secondary shaft for transmitting a torque multiplying drive from said primary runner to said secondary shaft when said primary and secondary shafts are directly drivingly connected, said torque multiplying driving means including an overrunning clutch interposed in the drive from said primary runner to said secondary shaft and so constructed and arranged as to provide overrun of said primary runner by said secondary runner, and an overrunning clutch operably disposed between said impeller and secondary runner and acting to prevent the impeller speed from falling below that of said secondary runner while accommodating rotation of the impeller at a speed greater than that of said secondary runner.

HERBERT F. PATTERSON.